(12) United States Patent
Hall et al.

(10) Patent No.: US 9,966,788 B2
(45) Date of Patent: May 8, 2018

(54) SWITCH WITH MAGNETIC PRONGS FOR DOCKING

(71) Applicants: David R. Hall, Provo, UT (US); Mark Hall, Springville, UT (US); Clint Cook, American Fork, UT (US); Davido Hyer, Spanish Fork, UT (US); Joe Fox, Spanish Fork, UT (US); Jedediah Knight, Provo, UT (US)

(72) Inventors: David R. Hall, Provo, UT (US); Mark Hall, Springville, UT (US); Clint Cook, American Fork, UT (US); Davido Hyer, Spanish Fork, UT (US); Joe Fox, Spanish Fork, UT (US); Jedediah Knight, Provo, UT (US)

(*) Notice: Subject to any disclaimer, the term of this patent is extended or adjusted under 35 U.S.C. 154(b) by 69 days.

(21) Appl. No.: 15/185,335

(22) Filed: Jun. 17, 2016

(65) Prior Publication Data

US 2017/0366033 A1    Dec. 21, 2017

(51) Int. Cl.
*H02J 7/00* (2006.01)
*H02J 7/02* (2016.01)
*H02J 50/10* (2016.01)

(52) U.S. Cl.
CPC .............. *H02J 7/025* (2013.01); *H02J 7/027* (2013.01); *H02J 50/10* (2016.02); *H02J 2007/005* (2013.01)

(58) Field of Classification Search
CPC .............. H02J 7/025; H02J 50/10; H02J 7/027
See application file for complete search history.

(56) References Cited

U.S. PATENT DOCUMENTS

| 3,750,083 | A * | 7/1973 | Fayling ................. A47J 39/006 219/495 |
| 5,931,683 | A * | 8/1999 | Pinel ................... H01R 13/2442 320/115 |
| 7,963,774 | B2 * | 6/2011 | Shiff ................... H01R 13/6205 439/38 |
| 8,022,664 | B2 * | 9/2011 | Shu ........................ B25J 19/005 320/107 |
| 8,672,228 | B1 * | 3/2014 | Saini ..................... H01R 11/30 235/486 |
| 8,963,498 | B2 * | 2/2015 | Ferguson ............... B65H 75/48 320/107 |
| 8,973,816 | B1 * | 3/2015 | Saini ..................... H01R 11/30 235/375 |
| 9,389,642 | B2 * | 7/2016 | Ashcraft ............... G06F 1/1632 |
| 2016/0134153 | A1 * | 5/2016 | Miller ..................... H02J 7/025 320/103 |
| 2017/0110902 | A1 * | 4/2017 | Miller ..................... H02J 7/025 |

\* cited by examiner

*Primary Examiner* — Stacy Whitmore

(57) ABSTRACT

An apparatus is disclosed that includes a battery-powered switch and a switch dock. The switch includes a microcontroller, a short range wireless transmitter, one or more tactile control buttons, and one or more magnetic prongs. The magnetic prongs are contained within prong slots in a switch body. The prongs are coupled at one end to at least one spring coupled to the switch body, and the spring exerts a retracting force on the prongs when the prongs extend outwards from the switch body. The dock includes one or more metallic holes, where the number of holes matches the number of prongs. The prongs extend from the switch body and fit in the holes when brought near enough to the holes that the holes exert a magnetic force on the prongs that is stronger than the retracting force exerted on the prongs by the spring.

20 Claims, 10 Drawing Sheets

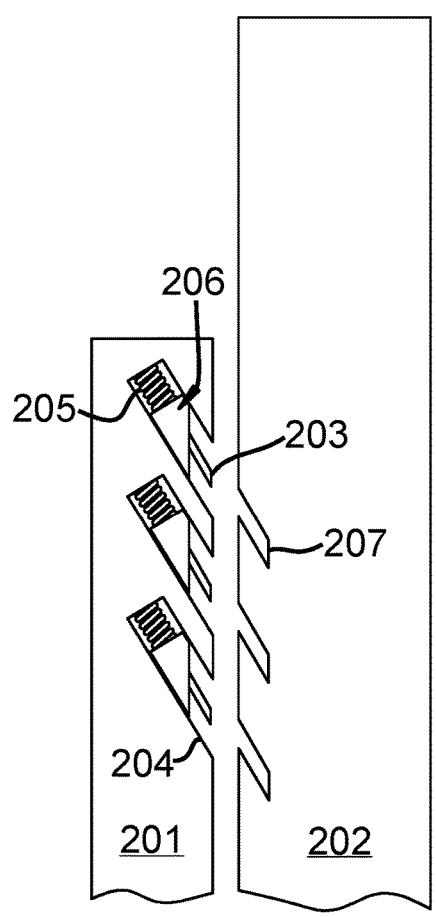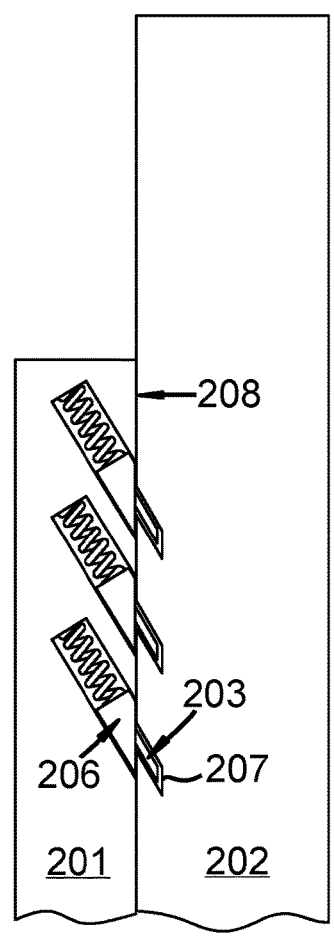
FIG. 2A
FIG. 2B

SWITCH WITH MAGNETIC PRONGS FOR DOCKING

TECHNICAL FIELD

This invention relates generally to the field of home automation, and more specifically to remotes and switches for home automation.

BACKGROUND

The Internet of Things (the "IoT") is an exploding area of technology which some argue is the next frontier of interconnectivity. A primary benefit of the IoT is remote control of devices, for example, around a home, office, or other commercial environment. Many solutions have been presented for remote control, including smartphone/tablet and internet applications, and hardware remotes. Hardware remotes have the benefit of being dedicated, local, and mobile. Despite these benefits, IoT manufacturers and designers still face the challenge of user acceptance, which includes bridging functionality that users are accustomed to with new functionality that enhances the user experience. While some solutions have been presented for wireless control of IoT devices, little has been done to address the need for bridging functionality. An additional problem with remote control of IoT devices is, simply, that remotes get lost. Many remote control manufacturers have addressed this problem by providing docks for remotes. Remotes are mounted to such docks magnetically, or by flexible plastic biases. However, such means of mounting remotes are often not sturdy enough for wall-mounted remotes in high-traffic areas where the remotes are likely to be inadvertently struck and dislodged.

SUMMARY OF THE INVENTION

A battery-powered switch and accompanying dock are disclosed that overcome or improve upon the limitations discussed above. In general, the switch includes a wireless transmitter and a microcontroller, and a magnetic component for mounting the switch to the dock. The dock includes ferromagnetic components for holding the switch. The magnetic and ferromagnetic components are complimentary prongs and slots, where the prong fits in the slot to mount the switch to the dock. The dock, which is mounted to a wall similar to a single-gang switch plate, holds the switch securely to prevent the switch from being easily dislodged. Additionally, the wireless switch is easily and conveniently removed from the dock.

The claimed invention addresses several issues with the current state of remotes for IoT devices. First, the dock and switch are mounted to a wall like a common, single-gang switch plate. The size and positioning is familiar to users, thus improving the likelihood of user adoption, bridging functionality a user is accustomed to with modern functionality. Additionally, the switch is mounted using prongs, which are more sturdy against dislodging than magnets alone and/or plastic biases, such as in high-traffic areas where the switch is likely to be struck.

In one embodiment, an apparatus is disclosed that includes a battery-powered switch and a switch dock. The switch includes a microcontroller, a wireless transmitter, and one or more magnetic prongs. The magnetic prongs are contained within prong slots in a switch body. The prong slots include a closed end, an open end, and one or more sidewalls extending from the open end to the closed end. The prongs are coupled at one end to at least one spring coupled to the switch body, and the spring exerts a retracting force on the prongs as the prongs extend outwards from the switch body. The dock includes one or more ferromagnetic slots, where the number of ferromagnetic slots matches the number of prongs. The prongs extend from the switch body to fit in the ferromagnetic slots as the prongs are brought near enough to the ferromagnetic slots for the ferromagnetic slots to exert a magnetic force on the prongs that is stronger than the retracting force exerted on the prongs by the spring.

In another embodiment, an apparatus is disclosed that includes a battery-powered switch and a switch dock. The switch includes a microcontroller, a wireless transmitter, and one or more magnetic slots in a back face of the switch. The dock includes one or more ferromagnetic prongs contained within prong slots in a dock body. The prong slots include a closed end, an open end, and one or more sidewalls extending from the open end to the closed end. Additionally, the prongs are coupled at one end to at least one spring coupled to the switch body. The spring exerts a retracting force on the prongs as the prongs extend outwards from the switch body. The number of magnetic slots matches the number of prongs, and the prongs fit in the magnetic slots to mount the switch to the dock. The prongs extend from the dock body to fit in the magnetic slots as the prongs are brought near enough to the magnetic slots for the magnetic slots to exert a magnetic force on the prongs that is stronger than the retracting force exerted on the prongs by the spring.

BRIEF DESCRIPTION OF THE DRAWINGS

A more particular description of the invention briefly described above is made below by reference to specific embodiments. Several embodiments are depicted in drawings included with this application, in which:

FIGS. 2A-B depict an alternative embodiment of a switch and dock apparatus including prong couplers;

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

In some instances, features represented by numerical values, such as dimensions, mass, quantities, and other properties that can be represented numerically, are stated as approximations. Unless otherwise stated, an approximate value means "correct to within 50% of the stated value." Thus, a length of approximately 1 inch should be read "1 inch +/−0.5 inch."

Figure 1:
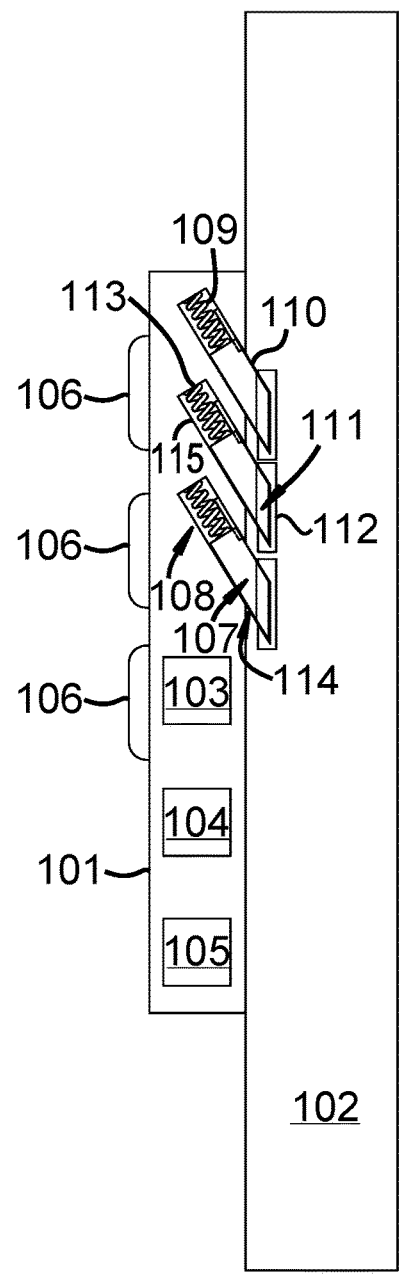
FIG. 1 depicts one embodiment of a battery-powered wireless switch with magnetic prongs and a switch dock with complimentary ferromagnetic slots.

FIG. 1 depicts one embodiment of a battery-powered wireless switch with magnetic prongs and a switch dock with complimentary ferromagnetic slots. Apparatus 100 includes battery-powered wireless switch 101 and switch dock 102. Switch 101 includes battery 103, microcontroller 104, wireless transmitter 105, tactile control buttons 106, and magnetic prongs 107. Prongs 107 are contained within prong slots 108 in a switch 101 body. Prongs 107 are coupled at one end to springs 109, which in turn are coupled to the switch body. Springs 109 exert a retracting force on prongs 107 as prongs 107 extend outwards from the switch body. Switch dock 102 includes ferromagnetic slots 110. The number of ferromagnetic slots 110 matches the number of prongs 107, and prongs 107 extend from the switch body to fit in ferromagnetic slots 110 as prongs 107 are brought near enough to ferromagnetic slots 110 for ferromagnetic slots 110 to exert a magnetic force on prongs 107 that is stronger that the retracting force exerted on prongs 107 by springs 109.

The switch body is made of any of a variety of off-the-shelf hard plastics typically used in plastics molding. Similarly, a dock 102 body is made of any of a variety of off-the-shelf hard plastics. For example, in one embodiment, dock 102 is made of the same material as a standard plastic light switch plate. Battery 103, microcontroller 104, and transmitter 105 are also off-the-shelf components. For example, in some embodiments, battery 103 is a 3V coin cell. In the same or other embodiments, microcontroller 104 is an ARM Cortex M4 controller and transmitter 105 is a Bluetooth transceiver. Additionally, as depicted, switch 101 includes several tactile control buttons 106. However, in some embodiments, switch 101 includes one control button 106. In other embodiments, switch 101 includes up to 50 control buttons 106. Though not depicted, other embodiments of apparatus 100 include a touch-screen instead of tactile control buttons. In yet other such embodiments, apparatus 100 includes a combination of a touch-screen and tactile control buttons.

Prongs 107 include permanent magnetic material 111. For example, in one embodiment, prongs 107 include magnetic material 111 at an opposite end from springs 109. Ferromagnetic slots 110 include ferromagnetic metal piece 112, which is complimentary to magnetic material 111. As prongs 107 are brought near ferromagnetic slots 110, a magnetic force is experienced by prongs 107 opposing the retracting force exerted by springs 109. In embodiments where an outside end of prongs 107 is flush with a back face of switch 101, magnetic material 111 must have a magnetic field strong enough that the magnetic force is greater than the retracting force exerted by springs 109 on prongs 107 at a distance between magnetic material 111 and metal piece 112 equal to a depth of ferromagnetic slots 110. Thus, as switch 101 is positioned in contact with dock 102 where prongs 107 are aligned with ferromagnetic slots 110, prongs 107 extend into ferromagnetic slots 110 and mount switch 101 to dock 102. In embodiments where the outside end of prongs 107 is recessed into the back face of switch 101, magnetic material 111 must have a magnetic field strong enough that the magnetic force is greater than the retracting force exerted by spring s 109 on prongs 107 at a distance between magnetic material 111 and metal piece 112 equal to the depth of ferromagnetic slots 110 plus the recess depth.

In some embodiments, magnetic material 111 is only a portion of prongs 107. In such embodiments, prongs 107 also include non-magnetic materials, such as hard plastics. The hard plastic material is coupled at one end to magnetic materials 111 and at the other end to springs 109. In other embodiments, prongs 107 are made entirely of magnetic materials 111. Similarly, in some embodiments, metal piece 112 is only a portion of ferromagnetic slots 110. For example, in the depicted embodiment, metal piece 112 is cup-shaped and covers only a portion of ferromagnetic slots 110. However, in some embodiments, ferromagnetic slots 110 are made entirely of metal pieces 112.

Springs 109 are, in some embodiments, any of a variety of off-the-shelf springs. For example, in embodiments where the portion of prongs 107 coupled to springs 109 is plastic, springs 109 are any of a variety of metal compression and/or tension springs. However, in embodiments where prongs 107 are entirely magnetic, springs 109 are non-magnetic compression and/or tension springs, such as springs made of plastic, composite materials, and/or non-ferromagnetic metals. As depicted, each prong 107 is coupled to an individual spring 109. Springs 109 retain prongs 107 within prong slots 108. Prong slots 108 include a closed end 113, an open end 114, and sidewalls 115 extending from open end 114 to closed end 113. Springs 109 are coupled to closed end 113, and prongs 107 extend through open end 114 to mount switch 101 to dock 102. For example, in some embodiments, prong slots 108 are cylindrical, having a single sidewall 115. In other embodiments, prong slots 108 are cubic, having four sidewalls 115. In yet other embodiments, prong slots 108 have a number of sidewalls 115 ranging from 5 to 10. In some embodiments, prongs 107 extend an entire length between sidewalls 115.

Prongs 107 and ferromagnetic slots 110 are aligned non-perpendicularly with switch and dock faces. For example, in the depicted embodiment, prongs 107 are partially aligned with the direction of gravity as switch 101 is mounted to dock 102. When fully extended, prongs 107 remain partially within prong slots 108. Gravity weighs on switch 101, causing prongs 107 to bind against sidewalls 115 and sidewalls of ferromagnetic slots 110, further securing switch 101 to dock 102. Various embodiments include prongs 107 and ferromagnetic slots 110 having angles of incidence with the switch and dock faces ranging from 1 to 89 degrees, 10 to 80 degrees, 15 to 75 degrees, 60 to 30 degrees, 50 to 40 degrees, and/or 45 degrees.

FIGS. 2A-B depict an alternative embodiment of a switch and dock apparatus including prong couplers. As shown in FIG. 2A, apparatus 200 includes switch 201 and switch dock 202 (similar to switch 101 and dock 102 described above). Switch 201 includes magnetic prongs 203 contained within prong slots 204, springs 205, and spring couplers 206, and dock 202 includes ferromagnetic slots 207. Springs 205 are coupled to prongs 203 by spring couplers 206. Thus, springs 205 are coupled at one end to a switch 101 body and at an opposite end to spring coupler 206, and spring couplers 206 are coupled to prongs 203 at an opposite end from where they are coupled to springs 205. Spring couplers 206 exert a force on each respective prong slot 204 sidewall to maintain an orientation of prongs 203 with regard to the respective prong slots 204. In some embodiments, prongs 203 are narrower than prong slots 204. In such embodiments, spring couplers 206 stabilize prongs 203 in the respective prong slots 204 to ensure proper alignment of prongs 203 with ferromagnetic slots 207.

As depicted in FIG. 2B, spring couplers 206 also aid in mounting switch 201 to dock 202. When prongs 203 are fully extended, the weight of switch 201 causes spring couplers 206 to bind against dock face 208, in addition to causing prong 203 to bind against sidewalls of ferromagnetic slots 207. This further supports switch 201 when it is mounted to dock 202.

Figure 3A:
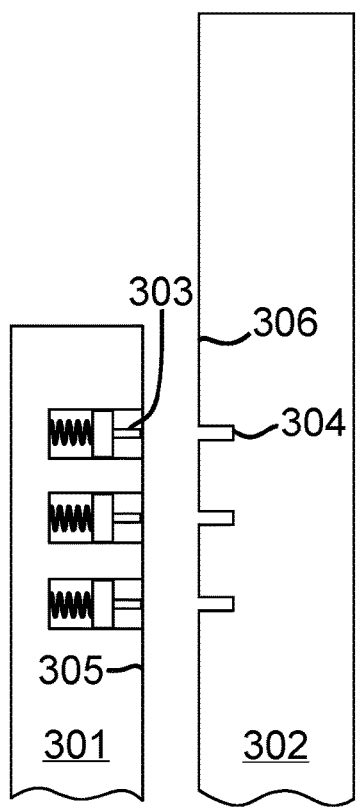
FIGS. 3A-B depict an embodiment of a switch and dock apparatus with prongs aligned perpendicular to the switch.
Figure 3B:
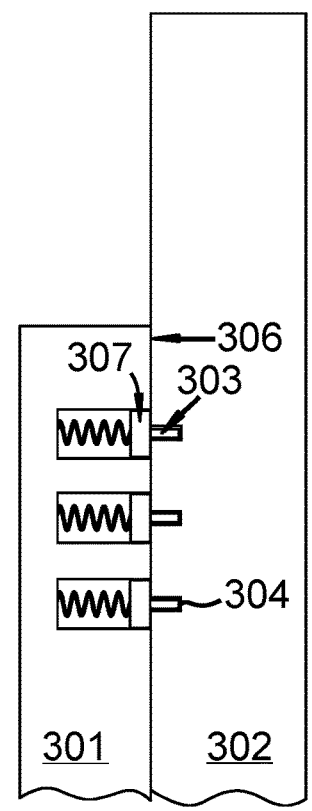

FIGS. 3A-B depicts an embodiment of a switch and dock apparatus with prongs aligned perpendicular to the switch. In previously described embodiments, the prongs and ferromagnetic slots were aligned non-perpendicularly. However, as shown in FIG. 3A, apparatus 300 includes switch 301 and dock 302 with prongs 303 and ferromagnetic slots 304 aligned perpendicular to switch face 305 and dock face 306. As shown in FIG. 3B, similar to previously described embodiments, when prongs 303 are fully extended, the weight of switch 301 causes spring couplers 307 to bind against dock face 306, in addition to causing prong 303 to bind against sidewalls of ferromagnetic slots 304. This further supports switch 301 when it is mounted to dock 302.

Figure 4A:
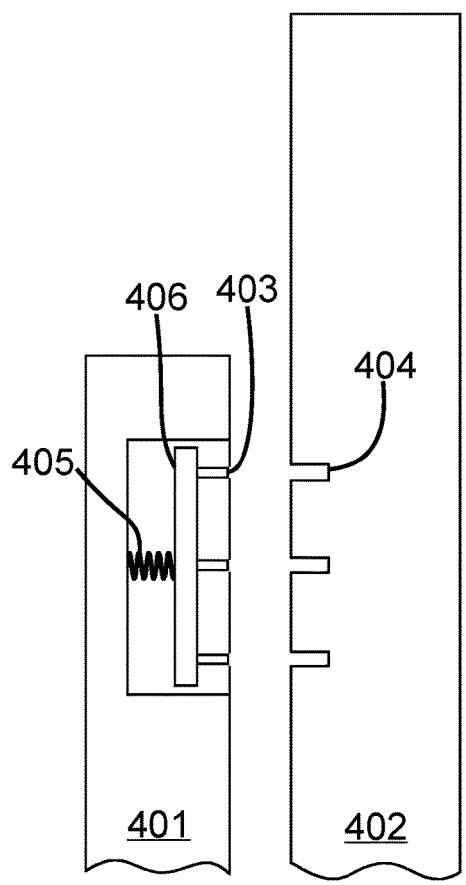
FIGS. 4A-B depict a switch and dock apparatus with one spring for all prongs.
Figure 4B:
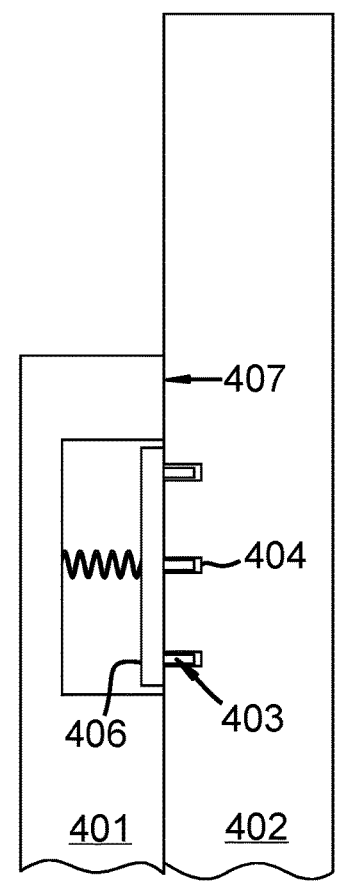

FIGS. 4A-B depicts a switch and dock apparatus with one spring for all prongs. As shown in FIG. 4A, apparatus 400 includes switch 401 and dock 402 (similar to switch 101 and dock 102 described above). Switch 401 includes multiple magnetic prongs 403, and dock 402 includes multiple corresponding ferromagnetic slots 404, but switch 401 includes only a single spring 405 and spring coupler 406. Prongs 403 are each coupled to spring 405 via spring coupler 406. As shown in FIG. 4B, when prongs 403 are fully extended, the weight of switch 401 causes spring coupler 406 to bind against dock face 407, in addition to causing prongs 403 to bind against sidewalls of ferromagnetic slots 404. This further supports switch 401 when it is mounted to dock 402.

Figure 5:
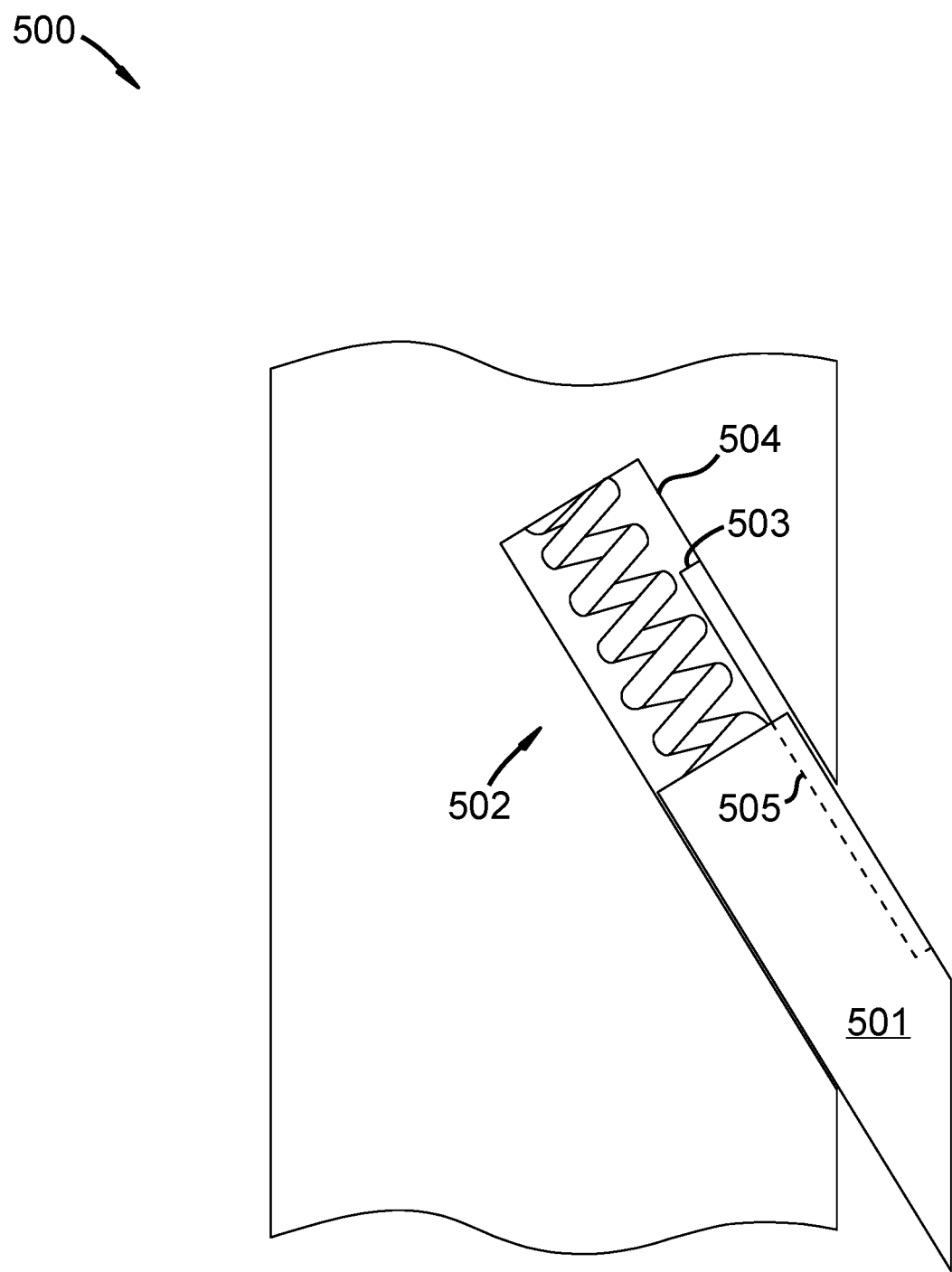
FIG. 5 depicts a switch with a notch and groove that align a mounting prong.

FIG. 5 depicts a switch with a notch and groove that align a mounting prong. Switch 500 includes magnetic prong 501 and prong slot 502. Prong slot 502 includes notch 503 along sidewall 504, and prong 501 includes groove 505 that fits over notch 503 and maintains an orientation of prong 501 with regard to prong slot 502. In the depicted embodiment switch 500 includes a single notch 503 along sidewall 504. However, in some embodiments switch 500 includes more than one notch 503 positioned along sidewall 504. For example, in one embodiment, prong slot 502 includes two notches 503 positioned on opposite sides of prong slot 502 along sidewall 504. Other embodiments include any number of notches, ranging from 3 to 8 notches. In any such embodiment with additional notches, prong 501 includes a corresponding number of grooves 505 complimentary to notches 503.

Though not depicted, in some embodiments, instead of prong slot 502 including notch 503, prong 501 includes notch 503 and prong slot 502 includes groove 505. In such embodiments, a ferromagnetic slot in a switch dock (not shown, but as in other embodiments described above) also includes groove 505 that receives notch 503 as prong 501 extends into the ferromagnetic slot.

Figure 6:
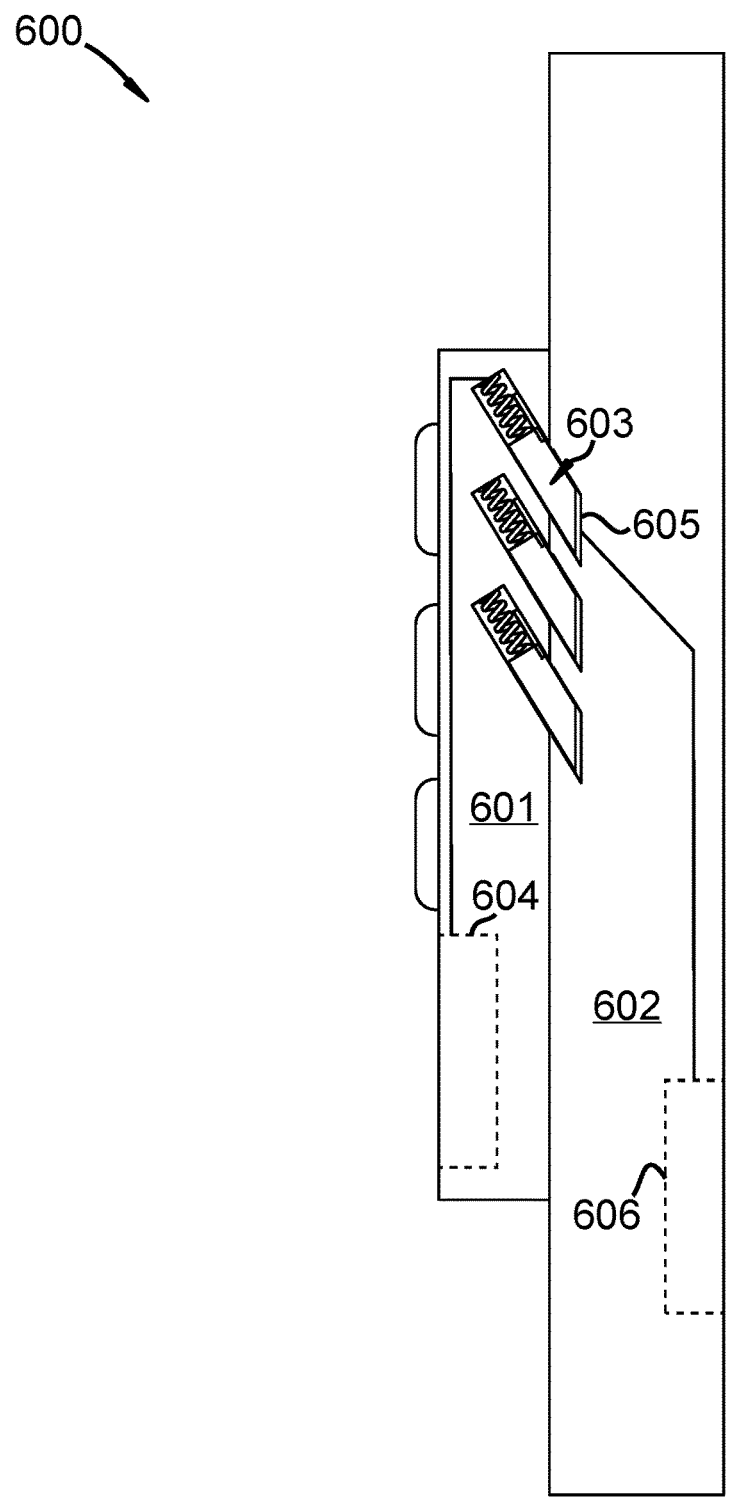
FIG. 6 depicts a switch and dock apparatus where the switch and dock communicate via a mounting prong.

FIG. 6 depicts a switch and dock apparatus where the switch and dock communicate via a mounting prong. Apparatus 600 includes switch 601 and dock 602. Switch 601 includes prongs 603, one of which is coupled to switch electronics 604. Similarly, dock 602 includes ferromagnetic slots 605, one of which is coupled to dock electronics 606. Switch electronics 604 include a microcontroller, transmitter, and/or battery, such as is described above with regard to FIG. 1. Dock electronics 606 includes hardware memory, one or more hardware processors, and/or a transceiver. Additionally, in some embodiments, dock electronics 606 include a power source such as a battery and/or mains electricity.

In some embodiments of apparatus 600, one of more of prongs 603 are coupled to the switch battery, and one or more of ferromagnetic slots 605 are coupled to the dock power source. In such embodiments, prongs 603 transfer energy between switch 601 and dock 602 to charge the switch battery. For example, in one embodiment, prongs 603 includes a magnetic portion, a conducting portion, and an insulating portion between the magnetic portion and the conducting portion. Similarly, ferromagnetic slots 605 include a ferromagnetic portion, a conducting portion, and an insulating portion between the ferromagnetic portion and the conducting portion. The magnetic portions aid in mounting switch 601 to dock 602, and the conducting portions transfer energy from dock 602 to switch 601 to charge the switch battery. In some embodiments, dock 602 additionally includes an AC power converter that converts mains AC electricity to DC. In such embodiments, the current is controlled so that the magnetic field induced in the conducting portions by the current aligns with the magnetic field of the magnetic portion.

In some embodiments of apparatus 600, one or more of prongs 603 are coupled to the switch microcontroller, and one or more of ferromagnetic slots 605 are coupled to one or more of the hardware memory or hardware processors. In such embodiments, switch 601 communicates information with dock 602 via prongs 603 and ferromagnetic slots 605. For example, in some embodiments, one prong 603 communicates information between switch 601 and dock 602, one prong 603 charges switch 601, and one prong 603 magnetically mounts switch 601 to dock 602. On other embodiments, one prong 603 communicates, charges, and magnetically mounts, and another prong 603 is a ground and magnetically mounts.

Figure 7A:
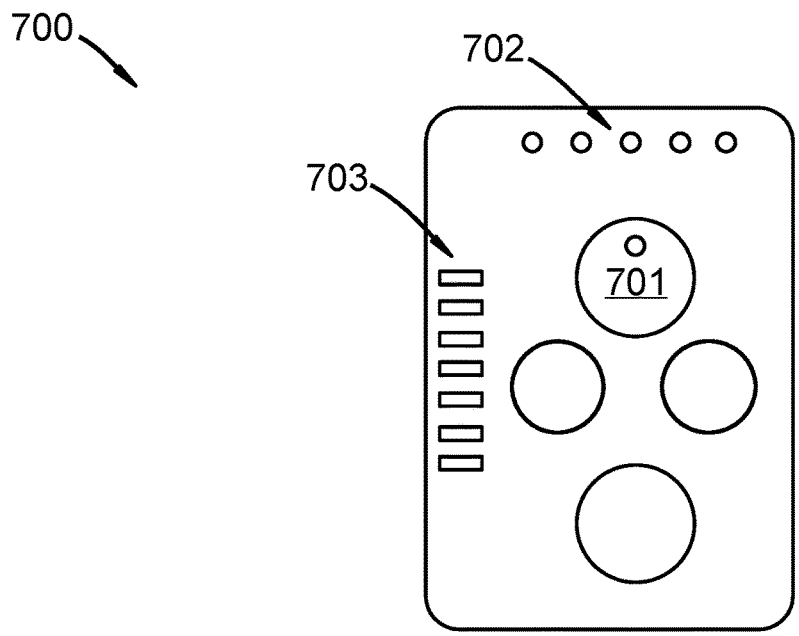
FIGS. 7A-C depict embodiments of a wireless switch including user controls and indicators.
Figures 7B, 7C:
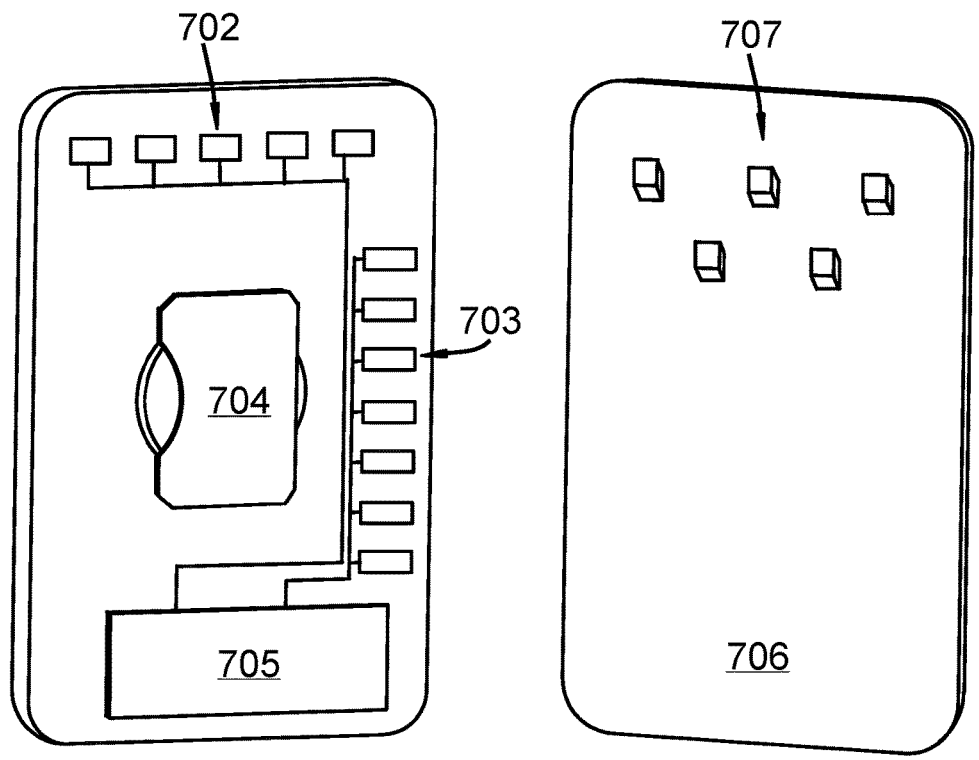

FIGS. 7A-C depict embodiments of a wireless switch including user controls and indicators. FIG. 7A includes switch 700, tactile control buttons 701, device type LED indicator lights 702, and device status LED indicator lights 703. Control buttons 701 allow a user to select one or more groups of devices and then send and receive signals between switch 700 and the selected device or devices (not shown). Though not depicted, in some embodiments, switch 700 includes a touch-screen instead of or in addition to control buttons 701. As depicted, LEDs 702 are aligned parallel to a top portion of switch 700, and LEDs 703 are aligned parallel to a side portion of switch 700. However, in other embodiments not depicted, LEDs 702, 703 are aligned in various positions on switch 500. For example, in one embodiment, each set of LEDs 702, 703 are aligned parallel to the top portion. In a similar embodiment, each set of LEDs 702, 703 are aligned parallel to a bottom portion. Those of skill in the art will recognize other similar alignments of LEDs 702, 703 on switch 700.

LEDs 702 indicate to a user one or more groups of devices selected for control by switch 700. As depicted, LEDs 702 indicate to a user up to five groups of devices selected for control. However, in some embodiments (though not depicted), switch 700 controls up to two groups of devices, and includes only two LEDs 702. In other embodiments, the number of LEDs 702, and the number of device groups switch 700 controls, ranges from 2 to 10. A single LED 702 lights corresponding to a group of devices selected for control. For example, in one embodiment, a user operates switch 700 to control an electric fan and/or an air conditioner unit. One LED 702 corresponds to the electric fan and illuminates when the user selects the electric fan for control by switch 700. Another LED 702 corresponds to the air conditioner unit and illuminates as the user selects the air conditioner unit for control by switch 700.

LEDs 703 indicate to a user a selected-device operation level. As depicted, LEDs 703 indicate to a user up to 7 status levels of devices selected for control. In other embodiments, the number of LEDs 703, and number of statuses displayed, ranges from 2 to 20. LEDs 703 light corresponding to a status of a device selected for control. For example, in one embodiment, a user operates a wireless switch 700 to control an electric light. An LED 02 corresponds to the electric light and will illuminate as the electric light is selected for control. Using buttons 701, the user switches the light on. A corresponding LED 703 illuminates indicating the selected light is on. Using buttons 701, the user switches the light off. Another corresponding LED 703 illuminates indicating the selected light is off. In another embodiment, a user operates wireless switch 700 to control an electric fan. An LED 702 corresponds to the fan and will illuminate as the fan is selected for control. Using buttons 701, the user switches the fan to a low setting. A corresponding LED 703 illuminates indicating the selected fan is set at low. Using buttons 701, the user switches the fan to a high setting. Another corresponding LED 703 illuminates indicating the selected fan is set at high. Alternatively, in some embodiments, a number of LEDs 703 light up corresponding to a speed of the fan. For example, at low speed, one LED 703 lights. At medium speed, 4 LEDs 703 light. At high speed, all LEDs 703 light.

FIG. 7B depicts and inside-back view of switch 700, including LEDs 702, 703, battery 704, and switch electronics 705. Switch electronics 705 include a microcontroller and transmitter. FIG. 7C depicts an inside view of switch back 706, which includes prong slots 707.

Figure 8:
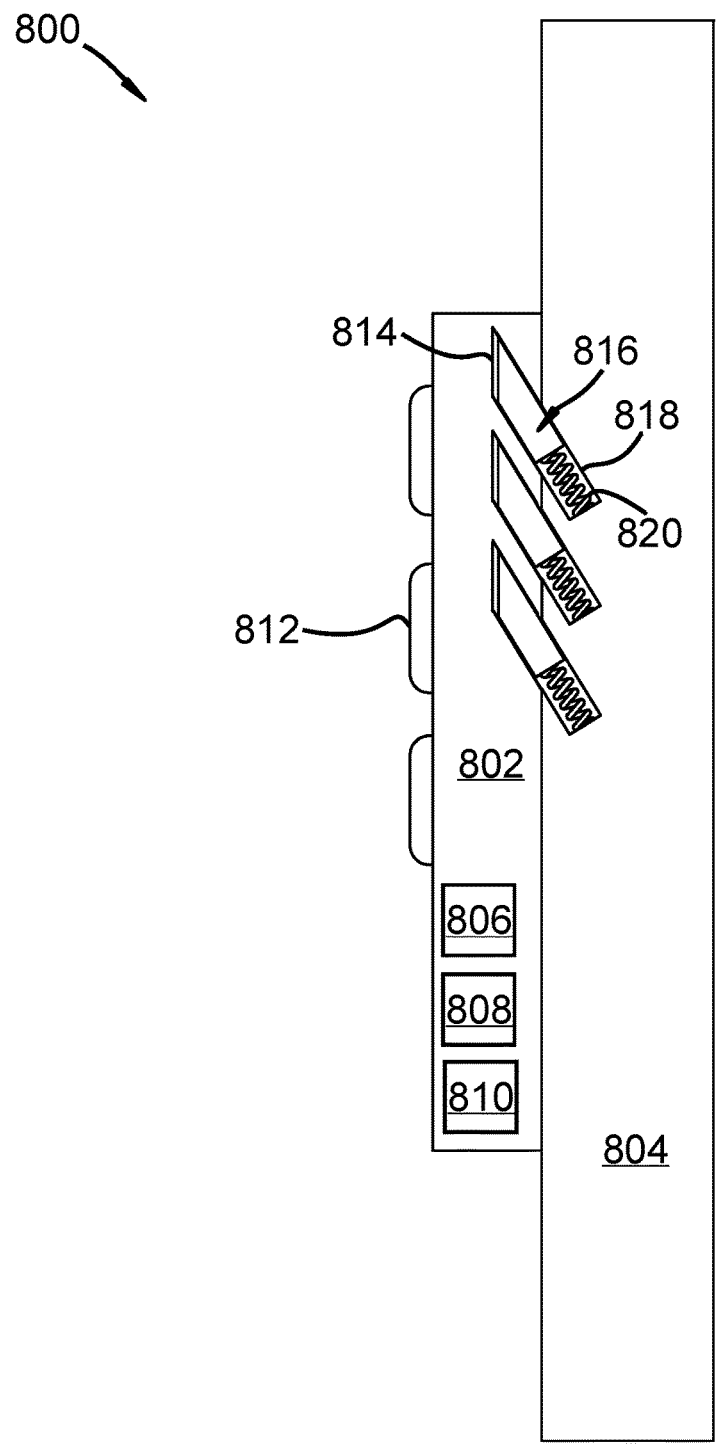
FIG. 8 depicts an apparatus including a wireless switch mounted to a switch dock.

FIG. 8 depicts an apparatus including a wireless switch mounted to a switch dock. The apparatus is similar to the apparatuses described above with regard to FIGS. 1-7, except the dock includes the magnetic prongs and the switch includes the ferromagnetic slots. Apparatus 800 includes battery-powered wireless switch 802 and switch dock 804. Switch 802 includes battery 806, microcontroller 808, wireless transmitter 810, tactile control buttons 812, and magnetic ferromagnetic slots 814 in a back face of switch 802. Dock 804 includes ferromagnetic prongs 816, a number of magnetic slots 814 matching a number of prongs 816, contained within prong slots 818 in a body of dock 804 and springs 820. Prongs 816 are coupled at one end to springs 820, and springs 820 are coupled to the body of dock 804. As prongs 816 extend outwards from the body of dock 804, as depicted, springs 820 exert a retracting force on prongs 816. As depicted, ferromagnetic prongs 816 extend from the body of dock 804 to fit in magnetic slots 814 as prongs 816 are brought near enough to magnetic slots 814 for magnetic slots 814 to exert a magnetic force on prongs 816 that is stronger than the retracting force exerted on prongs 816 by springs 820. Prongs 816 extend into magnetic slots 814 and mount switch 802 to dock 804.

In the depicted embodiment, switch 802 includes 3 tactile control buttons 812. However, in other embodiments, for example, switch 802 includes upwards of 50 control buttons 812. In yet other embodiments, switch 802 includes a single control button 812. Also in the depicted embodiment, dock 804 includes 3 prongs 816. However, in other embodiments, for example, dock 804 includes upwards of 20 prongs 816 with a corresponding number of magnetic slots 814 in switch 802. In yet other embodiments, dock 804 includes a single prong 816 and switch 802 includes a single corresponding magnetic slot 814. Additionally, as depicted, dock 804 includes one spring 820 for each prong 816. However, in other embodiments, dock 804 includes one spring 820 coupled to multiple prongs 816 (such as described above with regard to FIGS. 4A-B). In yet other embodiments, dock 804 includes multiple springs 820, each of which are coupled to multiple prongs 816.

Prong slots 818 include a closed end, an open end, and one or more sidewalls extending from the open end to the closed end. In some embodiments (similar to FIGS. 2 and 3), prongs 816 are each coupled to separate springs 820 by a spring coupler. The spring coupler exerts a force on the sidewalls of each prong slot 818, maintaining an orientation of each of prongs 816 with regard to each corresponding prong slot 818. Additionally, in embodiments, prong slots 818 each include one or more notches (similar to FIG. 5) along at least one of the one or more sidewalls and prongs 816 include one or more corresponding grooves that fit over the notches to maintain an orientation of prongs 816 with regard to prong slots 818.

Figure 9:
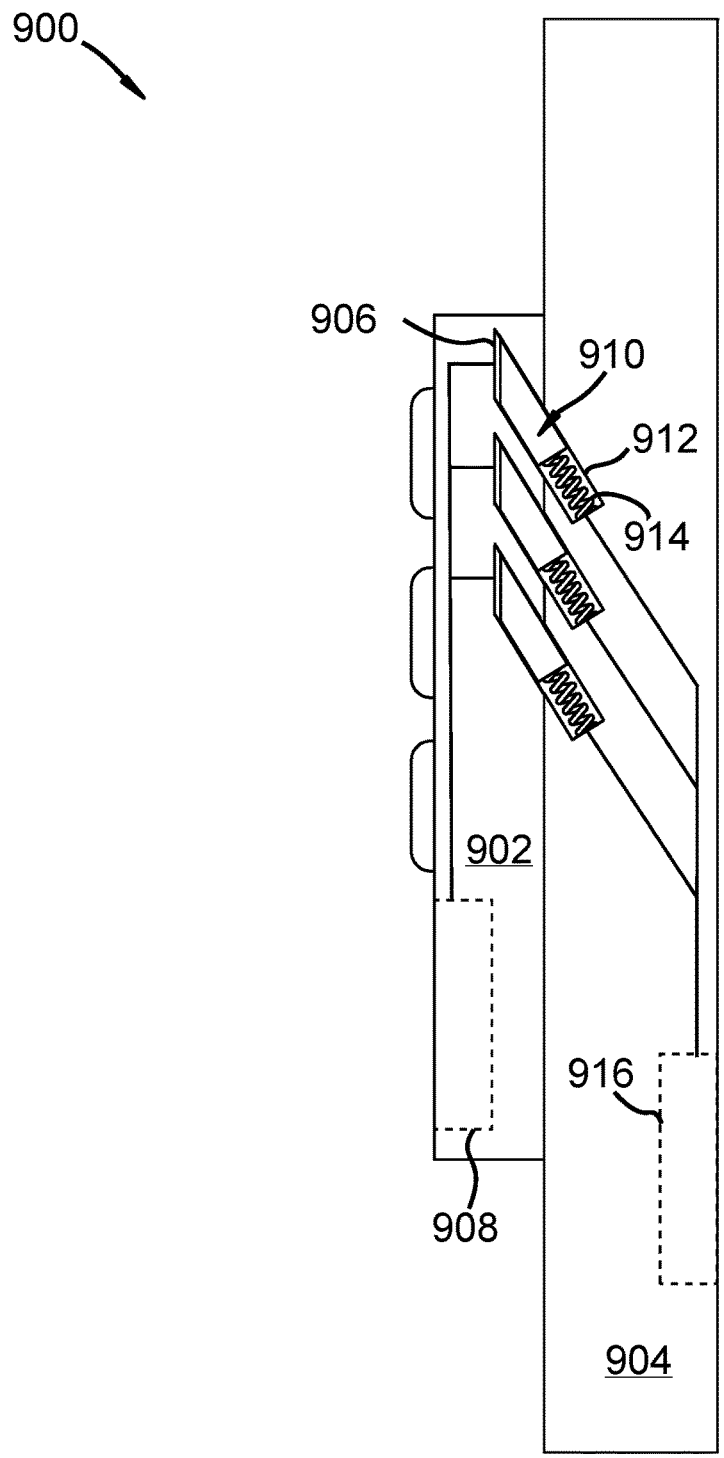
FIG. 9 depicts an electrically coupled switch and dock apparatus.

FIG. 9 depicts an electrically coupled switch and dock apparatus. Apparatus 900 includes battery-powered switch 902 and switch dock 904. Switch 902 includes magnetic slots 906 and switch electronics 908. Dock 904 includes ferromagnetic prongs 910, prong slots 912, springs 914, and dock electronics 916. As shown, magnetic slots 906 are electrically coupled to switch electronics 908 and prongs 910 are electrically coupled to dock electronics 916. For example, in some embodiments switch electronics 908 include a battery and dock electronics 916 include a power source. In such embodiments, one or more magnetic slots 906 are electrically coupled to the battery of switch 902 and prongs 910 are electrically coupled to the power source of dock 904, such that prongs 910 and magnetic slots 906 transfer energy between switch 902 and dock 904 to charge the battery of switch 902.

In other embodiments, switch electronics 908 include a switch microcontroller and a switch transceiver, and dock electronics 916 further include dock hardware memory, one or more dock hardware processors, and a dock transceiver. In such embodiments, magnetic slots 906 are electrically coupled to the switch microcontroller and prongs 910 are electrically coupled to one or more of the dock hardware memory or dock hardware processors, such that switch 902 communicates information with dock 904 via prongs 910 and magnetic slots 906.

Figures 10A, 10B:
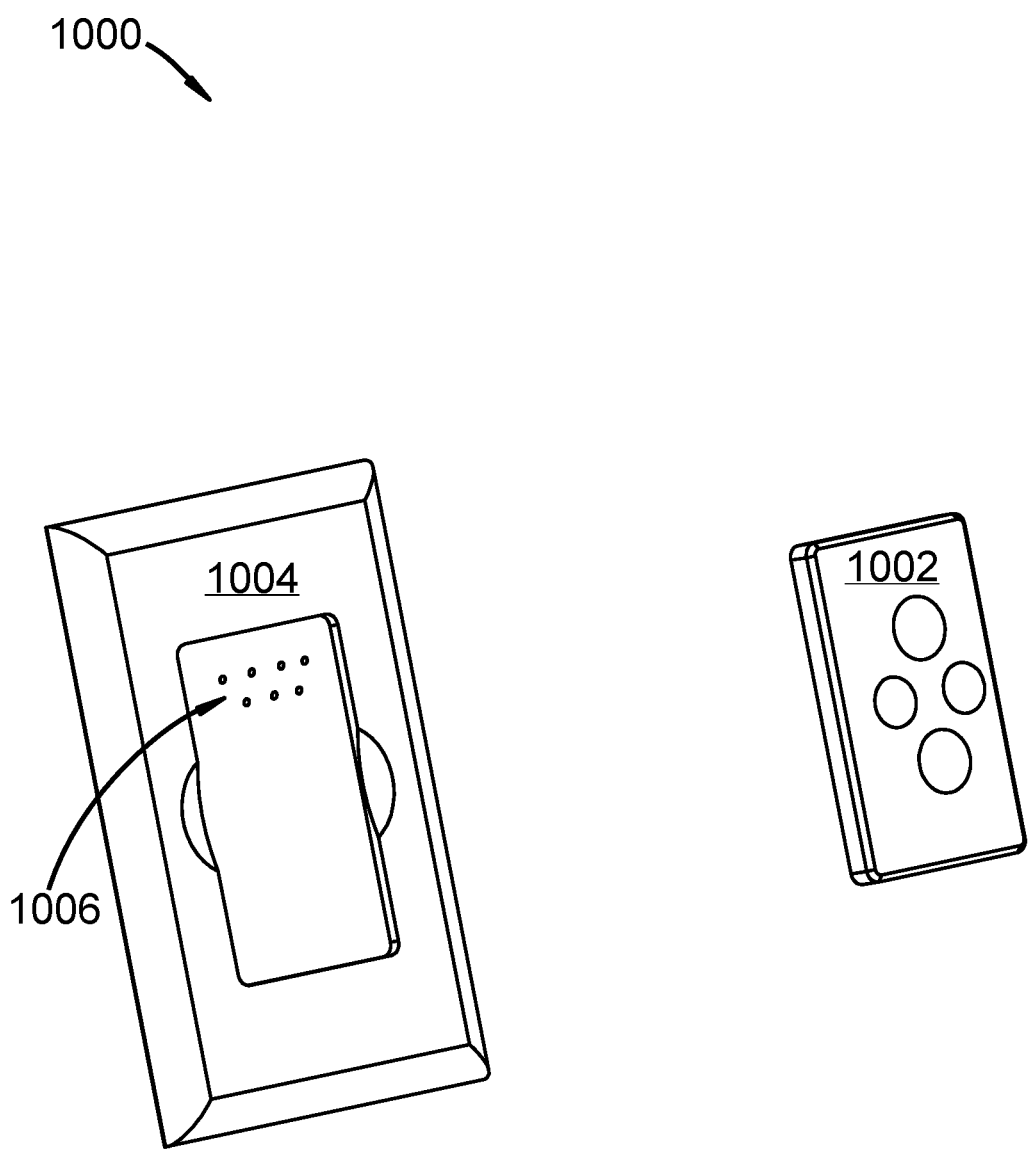
FIGS. 10A-B depict a perspective view of a switch and dock.

FIGS. 10A-B depict a perspective view of a switch and dock. FIG. 10A shows switch dock 1004, and FIG. 10B shows battery-powered wireless switch 1002 and switch dock 1004. As depicted, dock 1004 includes multiple ferromagnetic slots 1006. Though not shown, switch 1002 includes multiple magnetic prongs contained within prong slots, which are coupled to a body of switch 1002 via springs with a retracting force. The multiple prongs correspond to ferromagnetic slots 1006. As switch 1002 is brought near enough to dock 1004 such that ferromagnetic slots 1006 exert a magnetic force on the prongs that is stronger than the retracting force exerted on the prongs by the springs, the prongs extend into ferromagnetic slots 1006 and mount switch 1002 to dock 1004.

The invention claimed is:
1. An apparatus comprising:
 a battery-powered wireless switch having a microcontroller, a wireless transmitter, and one or more magnetic prongs contained within prong slots in a switch body, wherein the prongs are coupled at one end to at least one spring coupled to the switch body, and wherein the spring exerts a retracting force on the prongs as the prongs extend outwards from the switch body; and a switch dock comprising one or more ferromagnetic slots, wherein the number of ferromagnetic slots matches the number of prongs, and wherein the prongs extend from the switch body and fit in the ferromagnetic slots as the prongs are brought near enough to the ferromagnetic slots that the ferromagnetic slots exert a magnetic force on the prongs that is stronger than the retracting force exerted on the prongs by the spring, and the magnetic prongs and the prong slots comprise mating incident angles of between about 15 degrees and 75 degrees.

2. The apparatus of claim 1, wherein the prongs are each coupled to the same spring.

3. The apparatus of claim 1, wherein the prong slots comprise a closed end, an open end, and one or more sidewalls extending from the open end to the closed end, and wherein the prongs are each coupled to separate springs.

4. The apparatus of claim 3, wherein the springs are coupled to the prongs by a spring coupler, wherein the spring coupler exerts a force on each prong slot sidewall and maintains an orientation of the prong with regard to the prong slot.

5. The apparatus of claim 3, wherein the prong slot comprises a notch along at least one of the one or more sidewalls, and wherein the prong comprises a groove that fits over the notch and maintains an orientation of the prong with regard to the prong slot.

6. The apparatus of claim 1, wherein the prongs are coupled to the switch battery, wherein the prong slots are coupled to a power source, and wherein the prongs transfer energy between the switch and the dock and charge the battery.

7. The apparatus of claim 1, the dock further comprising hardware memory, one or more hardware processors, and a transceiver.

8. The apparatus of claim 7, wherein the prongs are coupled to the switch microcontroller, and wherein the prong slots are coupled to one or more of the hardware memory or hardware processors, wherein the switch communicates information with the dock via the prongs and prong slots.

9. The apparatus of claim 1, the switch further comprising two or more device type LED indicator lights and two or more device status LED indicator lights, wherein the device type indicator lights indicate to a user one or more groups of devices selected for control by the switch, and wherein the device status indicator lights indicate to a user a selected-device operation level.

10. The apparatus of claim 9, wherein the two or more device type indicator lights are aligned parallel to a top portion of the switch, and wherein the two or more device status indicator lights are aligned parallel to a side portion of the switch.

11. An apparatus comprising:
a battery-powered wireless switch having a microcontroller, a wireless transmitter, and one or more magnetic slots in a back face of the switch; and
a switch dock comprising one or more ferromagnetic prongs contained within prong slots in a dock body, wherein the prongs are coupled at one end to at least one spring coupled to the dock body, wherein the spring exerts a retracting force on the prongs as the prongs extend outwards from the dock body, wherein the number of magnetic slots matches the number of prongs, and wherein the ferromagnetic prongs fit in the magnetic slots and mount the switch to the dock, wherein the prongs extend from the dock body and fit in the magnetic slots as the prongs are brought near enough to the magnetic slots that the magnetic slots exert a magnetic force on the prongs that is stronger than the retracting force exerted on the prongs by the spring, and the magnetic prongs and the prong slots comprise mating incident angles of between 15 degrees and 75 degrees.

12. The apparatus of claim 11, wherein the prongs are each coupled to the same spring.

13. The apparatus of claim 11, wherein the prong slots comprise a closed end, an open end, and one or more sidewalls extending from the open end to the closed end, and wherein the prongs are each coupled to separate springs.

14. The apparatus of claim 13, wherein the springs are coupled to the prongs by a spring coupler, wherein the spring coupler exerts a force on each prong slot sidewall and maintains an orientation of the prong with regard to the prong slot.

15. The apparatus of claim 13, wherein the prong slot comprises a notch along at least one of the one or more sidewalls, and wherein the prong comprises a groove that fits over the notch, and maintains an orientation of the prong with regard to the prong slot.

16. The apparatus of claim 11, wherein the magnetic slots are coupled to the switch battery, and wherein the dock is coupled to a power source, wherein the prongs and magnetic slots transfer energy between the switch and the dock and charge the battery.

17. The apparatus of claim 11, the dock further comprising hardware memory, one or more hardware processors, and a transceiver.

18. The apparatus of claim 17, wherein the magnetic slots are coupled to the switch microcontroller, wherein the prongs are coupled to one or more of the hardware memory or hardware processors, wherein the switch communicates information with the dock via the prongs and magnetic slots.

19. The apparatus of claim 11, the switch further comprising two or more device type LED indicator lights and two or more device status LED indicator lights, wherein the device type indicator lights indicate to a user one or more groups of devices selected for control by the switch, and wherein the device status indicator lights indicate to a user a selected-device operation level.

20. The apparatus of claim 19, wherein the two or more device type indicator lights are aligned parallel to a top portion of the switch, and wherein the two or more device status indicator lights are aligned parallel to a side portion of the switch.

* * * * *